US012019516B2

(12) United States Patent
Yang et al.

(10) Patent No.: US 12,019,516 B2
(45) Date of Patent: *Jun. 25, 2024

(54) INSTANT WRITE SCHEME WITH DELAYED PARITY/RAID

(71) Applicant: Micron Technology, Inc., Boise, ID (US)

(72) Inventors: Lingming Yang, Boise, ID (US); Amitava Majumdar, Boise, ID (US); Sandeep Krishna Thirumala, Boise, ID (US); Nevil Gajera, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 13 days.

This patent is subject to a terminal disclaimer.

(21) Appl. No.: 17/894,886

(22) Filed: Aug. 24, 2022

(65) Prior Publication Data

US 2023/0236931 A1 Jul. 27, 2023

Related U.S. Application Data

(60) Provisional application No. 63/302,398, filed on Jan. 24, 2022.

(51) Int. Cl.
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0659* (2013.01); *G06F 3/0689* (2013.01); *G06F 11/1096* (2013.01)

(58) Field of Classification Search
CPC ............ G06F 11/1076; G06F 11/1096; G06F 3/0619; G06F 3/0659; G06F 3/0689
See application file for complete search history.

(56) References Cited

U.S. PATENT DOCUMENTS 11,494,087 B2 * 11/2022 Mappouras ......... G06F 11/0793
2023/0236934 A1 * 7/2023 Yang ...................... G06F 3/061
714/6.24

OTHER PUBLICATIONS

Prashnant J. Nair, et al., "XED: Exposing On-Die Error Detection Information for Strong Memory Reliability," 2016 ACM/IEEE 43rd Annual International Symposium on Computer Architecture (ISCA), 2016, pp. 341-353, doi: 10.1109/ISCA.2016.38.
(Continued)

*Primary Examiner* — Nadeem Iqbal
(74) *Attorney, Agent, or Firm* — Wood IP LLC; Theodore A. Wood (57) ABSTRACT

Provided is a memory system comprising a plurality of memory channels each having a parity bit, a redundant array of independent devices (RAID) parity channel, and a controller of the memory system. The controller is configured to receive a block of data for storage in the memory channels and determine at least one of (i) when a data traffic demand on the memory channels is high and (ii) when a data traffic demand on the memory channels is low. Upon determining the data traffic demand is low, writing the block of data for storage in the memory channels and concurrently updating the parity bits and the RAID parity channel for the stored block of data. Upon determining the data traffic demand is high, only writing the data for storage in the memory channels.

22 Claims, 7 Drawing Sheets

(56) References Cited

OTHER PUBLICATIONS

Kun Jian, et. al., "Low-power, Low-storage-overhead Chipkill Correct via Multi-line Error Correction," SC '13: Proceedings of the International Conference on High Performance Computing, Networking, Storage and Analysis, 2013, pp. 1-12, doi: 10.1145/2503210.2503243.

Kun Jian, et. al., "Adaptive Reliability Chipkill Correct (ARCC)," 2013 IEEE 19th International Symposium on High Performance Computer Architecture (HPCA), 2013, pp. 270-281, doi: 10.1109/HPCA.2013.6522325.

Aniruddha N. Udipi, et. al., "Rethinking DRAM Design and Organization for Energy-constrained Multi-cores," SIGARCH Comput. Archit. News 38, 3 (Jun. 2010), 175-186. DOI:https://doi.org/10.1145/1816038.1815983.

* cited by examiner

INSTANT WRITE SCHEME WITH DELAYED PARITY/RAID

CROSS REFERENCE TO RELATED APPLICATIONS

This application claims priority from U.S. Provisional Application No. 63/302,398 filed Jan. 24, 2022, the contents of which is hereby incorporated by reference.

TECHNICAL FIELD

The present disclosure relates generally to application-specific integrated circuits (ASICs) and more specifically to dynamic random access memory (DRAM).

BACKGROUND

Memory devices (also referred to as "memory media devices") are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

ASICs) may be designed and used for many different purposes in computers, cell phones, and other digital systems and control systems. For example, an ASIC may be a DRAM chip.

DRAMs are often plagued with errors which can lead to significant server downtime in data centers. Therefore, a low-power DRAM design targeted at data centers must be amenable to an architecture that provides a high standard of reliability. A common expectation of business-critical server DRAM systems is that they can withstand a single DRAM chip failure.

Therefore, error checking and correcting (ECC) should be available on all server DRAM. A variety of schemas have been employed to achieve this level of ECC, for example scattering the bits of a Hamming code ECC word across multiple memory chips, such that the failure of any single memory chip will affect only one ECC bit per word. A similar capability, called redundant array of inexpensive disks (RAID) in both hard disk drive (HDD) and Not-AND (NAND) memory chip technologies, may be employed so that if a chip fails (or has exceeded a threshold of bit errors), another, spare, memory chip is used to replace or supplement the failed chip.

An entire family of error resilient schemes can be designed for bit failures, such as single error correction double error detection (SECDED)). Similarly, a family of error-resilient schemes can also be designed for chip failure, such as single chip error correction double chip error detection (SCCDCD), referred to as chipkill.

BRIEF DESCRIPTION OF THE DRAWINGS

Advantageous designs of embodiment of the present disclosure result from independent and dependent claims, the description, and the drawing. In the following, preferred examples of embodiments of the disclosure are explained in detail with the aid of the attached drawings. The drawings, which are incorporated herein and form part of the specification, illustrate the present disclosure and, together with the description, serve to explain the principles of the disclosure and to enable a person skilled in the relevant art(s) to make and use the disclosure.

DETAILED DESCRIPTION

As used herein, a symbol is referred to as a data symbol if it holds user data, or as a check symbol if it holds redundant information for error detection or correction, or cyclic redundancy check (CRC) data. A group of data symbols, combined with the check symbols protecting that group of data symbols, form a codeword.

Figure 1A:
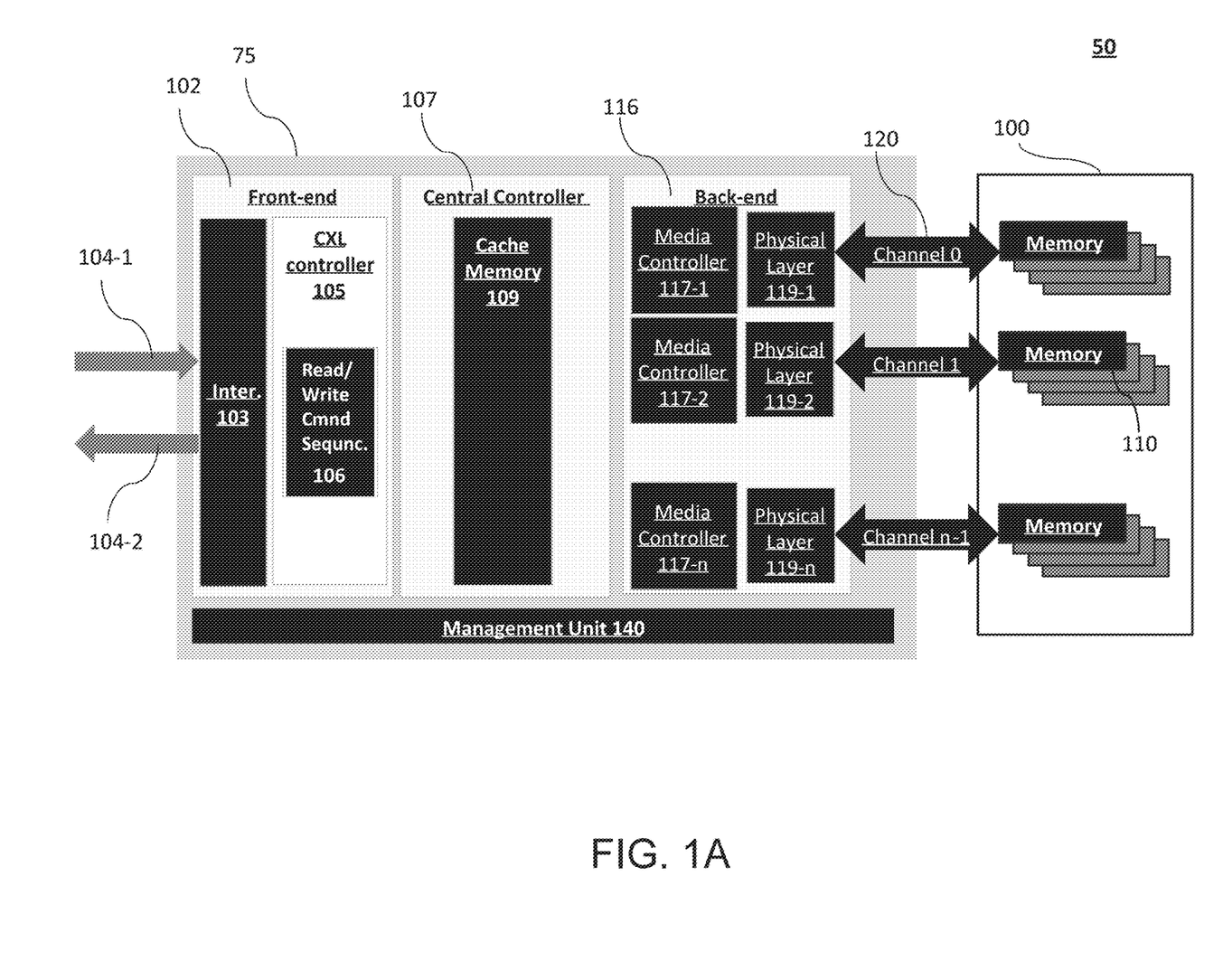
FIG. 1A illustrates a memory system architecture according to an embodiment.

The embodiments are employed in a memory system, which may be a compute express link (CXL) memory system. FIG. 1A illustrates a CRC-RAID system architecture 50 which may be part of a CXL memory system, according to an embodiment.

As shown in FIG. 1A, a memory controller 75 may include a front end 102, a central controller 107, and a back end 116. The front end 102 may also include an interface 103 that may include multiple I/O lanes 104-1 and 104-2 (individually or collectively referred to as I/O lanes 104 and may include any number of such lanes), as well as circuitry such as controller 105 to manage the interface 103.

The interface 103 may be a peripheral component interconnect express (PCIe) 5.0 interface coupled to the I/O lanes 104. In some embodiments, the CRC-RAID system architecture may receive access requests involving at least one of the cache memory 109, or a memory device via the interface 103 according to a CXL protocol. The interface 103 can receive data from a host processor (not shown) through I/O lanes 104. The controller 105 may use CXL protocols to manage the interface 103.

The central controller 107 may be configured to cause an increased performance of a memory operation. The central controller 107 may include a cache memory 109 to store data associated with performance of the memory operation. The cache memory 109 may be configured to buffer memory writes between a host processor and the plurality of memory channels 120.

The memory controller 75 may include an auxiliary security component such as encryption (not shown) to encrypt data before storing the data in a DRAM 100-1, 100-2, 100-3, 100-4 (various embodiments of which are illustrated in the present document in figures throughout and may be referred to collectively at DRAM 100), which may me located within a variety of memory devices.

Not shown in FIG. 1A, the central controller 107 may include a RAID controller and a CRC circuit; the CRC circuit may consist of CRC encoding and decoding circuits. The CRC circuit and/or RAID controller may instead be elements of the DRAM itself, as illustrated in other figures throughout this document.

As shown in FIG. 1A, the back end 116 may include a media controller 117 comprising a plurality of media controllers 117-1, 117-2, through 117-n. Back end 116 may also contain a physical (PHY) layer 119 comprising a plurality of PHY layers 119-1, 119-2, through 119-n, (individually or collectively referred to as PHY layer 119). In some embodiments, the back end 116 is configured to couple the PHY layer portion 119 to a plurality of memory channels 120 which connect to the DRAM 100.

Each of the plurality of media controllers 117 may receive a same command and address and drive the plurality of channels 120 substantially simultaneously. By using the same command and address for the plurality of media controllers, each of the plurality of media controllers may utilize the plurality of channels 120 to perform the same memory operation on the same plurality of memory cells 100.

The memory controller 75 may include a management unit 140 configured to recognize and manage sideband communications. In some embodiments, the management unit 140 includes an input/output (I/O) bus to manage out-of-band data, a management unit controller to execute firmware whose functionalities include monitoring and configuring characteristics of the memory controller 75. Also included is a management unit 140 to store data associated with memory controller 75 functionalities.

An endpoint of the management unit 140 may be exposed to a host system to manage data through a communication channel using an I/O bus. A second endpoint of the management unit 140 may be exposed to the host system to manage data through a communication channel. Characteristics monitored by the management unit 140 may include voltage supplied to the memory controller 75 or temperature measured by an external sensor, or both. The management unit 140 may also include a local bus interconnect to couple different components of the memory controller 75.

The CXL controller 105, the central controller 107, the management unit 140, and/or the backend 116 may contain firmware or other non-transitory, computer-readable medium storing code. This code includes instructions that, when executed by a processor of the CXL memory system 50, causes the system to execute the methods described below in this document.

Figure 1B:
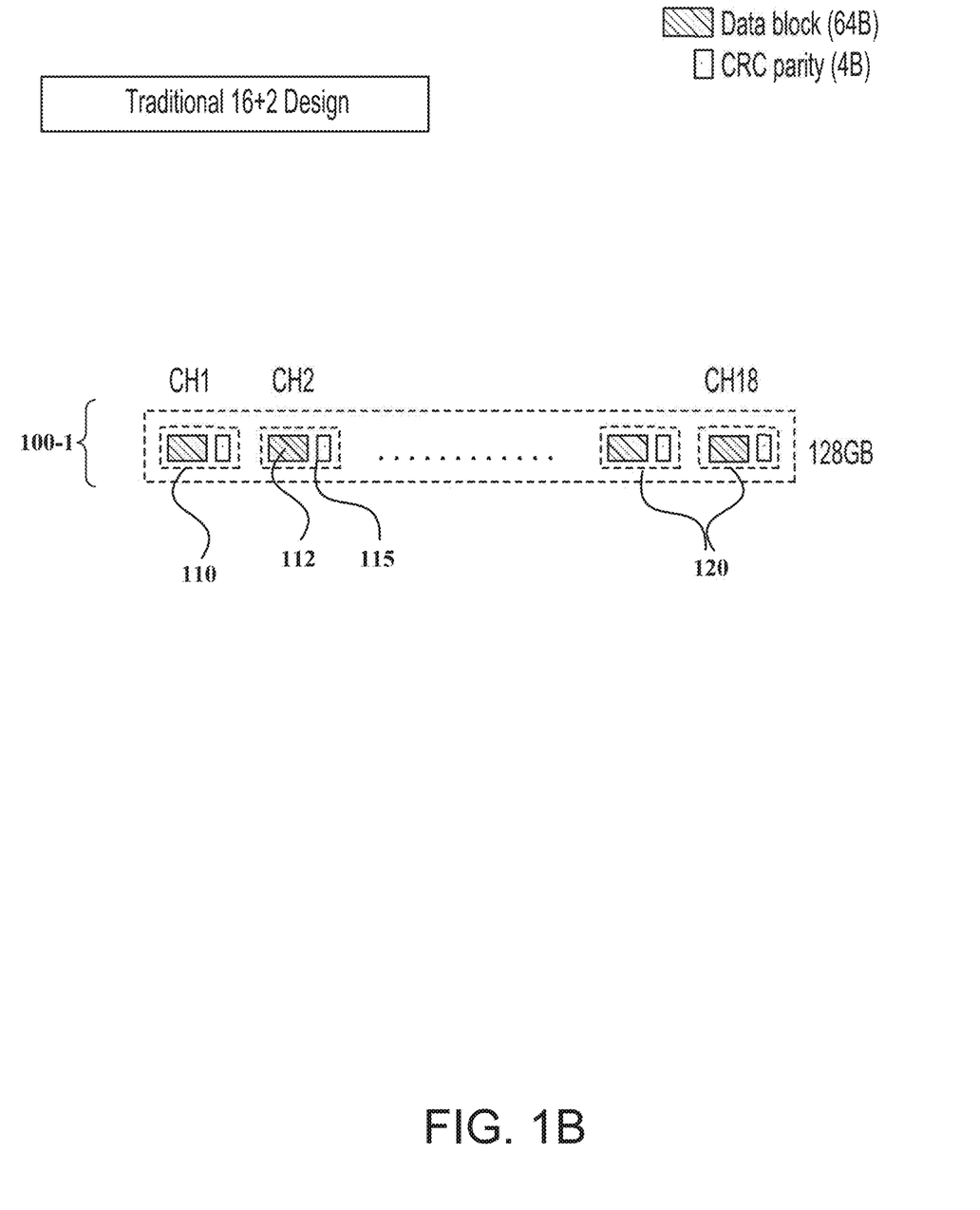
FIG. 1B illustrates an exemplary legacy DRAM memory environment.

FIG. 1B illustrates an exemplary legacy environment, including an exemplary legacy DRAM memory 100-1 which may employ chipkill technology (defined further below). The DRAM memory 100-1 and include, for example, eighteen DRAM data chips 110 for data storage. Each data chip 110 may have a data block 112 and a CRC parity block 115.

The configuration shown may be referred to as low power chip kill with over provision (LPCK OP). OP indicates that storage overhead is needed in the form of at least two extra data chips.

Commercial chipkill-correct solutions correct a single bad symbol in a DRAM data chip 110 and detect up to two bad symbols in each codeword. With reference again to FIG. 1, the data symbols are stored in the data blocks 112, the check symbols are stored in the CRC parity blocks 115, and the codewords are stored in the data chips 110.

Each data chip 110 provides one data symbol. Two or three extra/redundant chips 120 are provisioned for storing check symbols used to locate and correct faulty symbols (chips). Commercial chipkill-correct solutions generally require a minimum of two or three check symbols per codeword to provide SSC/SSCDSD. With chipkill technology, all data chips must be accessed simultaneously to form a cache line (CL).

As chipkill needs a minimum of two extra chips for storing these symbols, commercial implementations of chipkill generally require that eighteen chips be activated for each memory access (sixteen for data and two for check symbols).

Commercially available chipkill correct solutions that can detect up to two failed devices and correct one failed device (e.g., SSCDSD) require accessing thirty-six DRAM devices per memory request. In this 32+4 chipkill configuration, having thirty-six chips per rank leads to high memory power consumption because every device in a bank must be accessed per memory request. On the other hand, while single failed device correct (SSC) solution only requires accessing 18 devices per memory request, they are a weaker solution.

Both 16+2 and 32+4 configuration offer chipkill (SSCDSD and SSC respectively) and comes with redundancy overhead. In one embodiment, the redundancy overhead is around 13%. This overhead leads to significant increase in cost of DRAM modules offering chipkill protection.

Figure 2A:
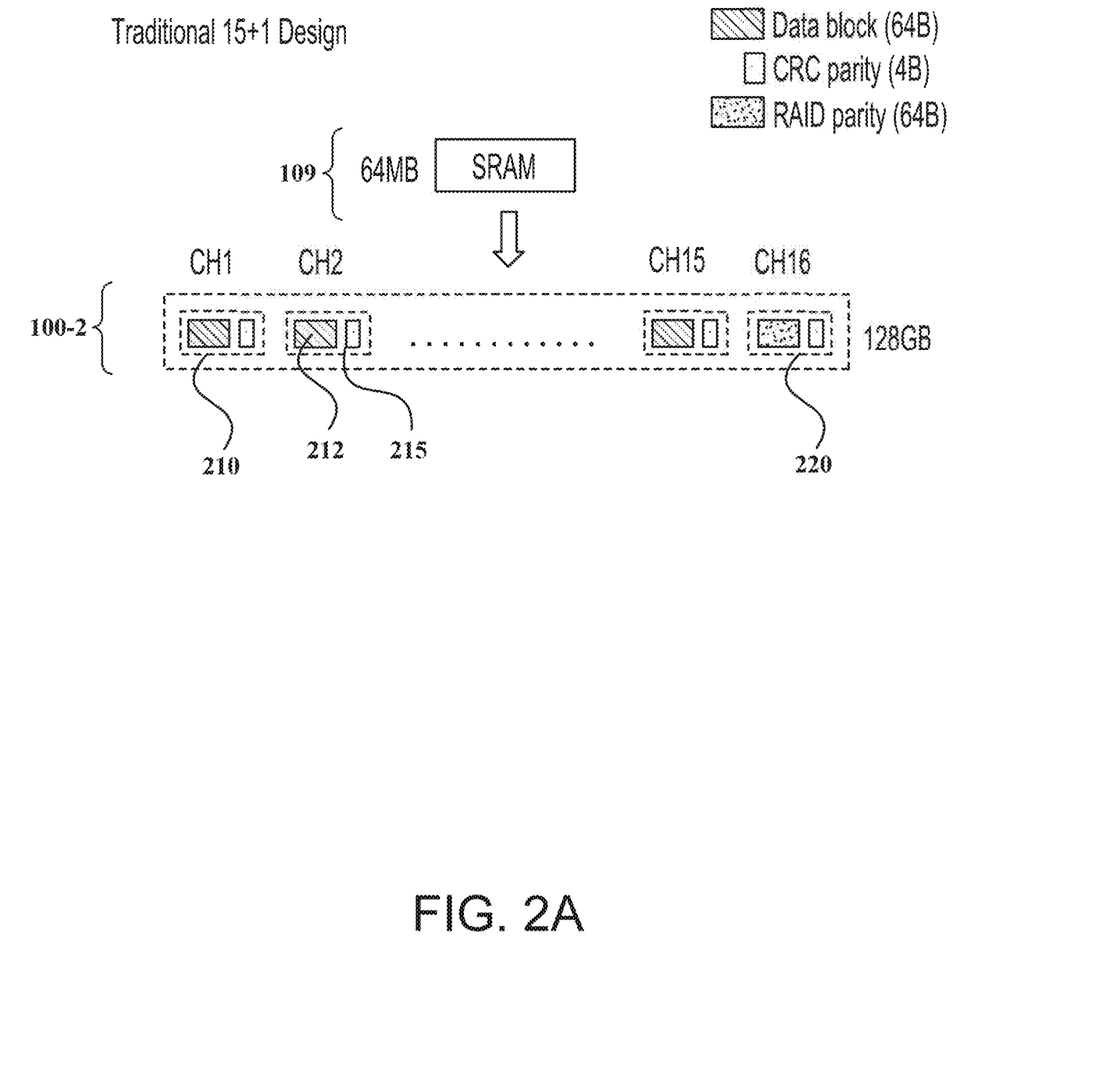
FIG. 2A illustrates an exemplary DRAM memory which may employ error checking plus RAID technology.

FIG. 2A illustrates an exemplary environment in which the embodiments may be applied, including an exemplary DRAM memory 100-2 which may employ error checking (such as CRC) plus RAID technology. The DRAM memory 100-2 may have, for example, fifteen DRAM data chips 210 for data storage, and one RAID parity chip 220. As before, each data chip 210 may have a data block 212 and a CRC parity block (parity bits) 215. In an alternative embodiment, a RAID design for DRAM with a single parity chip 220 has eight data chips and includes overhead. In an embodiment, the RAID design with 15+1 architecture reduces the overhead by around 7%.

Unlike chipkill, where all devices are accessed simultaneously to form a CL, RAID involves the use of a single DRAM chip 210 to get access to the CL. If the DRAM chip 210 were to produce corrupted data, there should be a way to re-construct it. This occurrence is akin to reliable disks where RAID is employed.

In the event of a CRC error while accessing a chip 210 (i.e., a fail upon read or write), RAID kicks in which reads all chips 210 and reconstruct the failed chip using the RAID parity stored in just one of the sixteen dies 220. Moreover, since only one chip is accessed at a time, significant power savings can be achieved. In contrast, traditional chipkill designs require all chips to be accessed simultaneously.

Figure 2B:
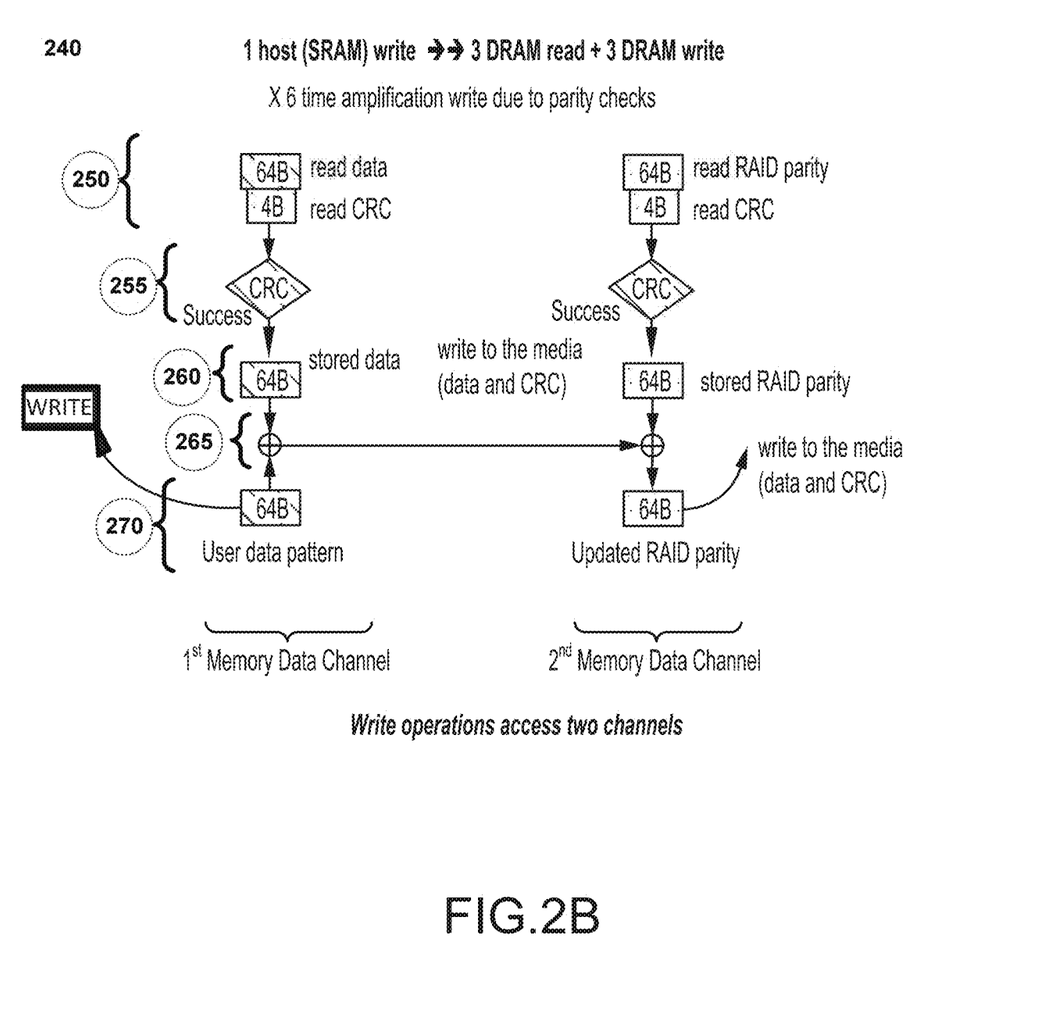
FIG. 2B illustrates an exemplary method where data is written to DRAM including RAID parity data.

FIG. 2B illustrates a method 240 where data is written to the DRAM (e.g., DRAM module 100-2) including RAID parity data (stored in channel 16, see FIG. 2A). In the method, a host such as static RAM 109 is written to (e.g., by a CPU or other host), the data is read, and the CRC data based on the read data is calculated.

Specifically, in a block 250, a write request is received and the DRAM module 100-2 reads data values from a cache memory 109 (e.g., SRAM) or the host processor. The data that is read from the cache or processor includes CRC values for the data and CRC for the RAID bytes. In block 255, the method calculates CRC values based on the data read in block 250. If the read CRC values and the calculated CRC values match, in block 260 the cache data, including the CRC values and the parity data (with its own CRC values), are stored in the DRAM.

In block 265, based on this stored data, new parity values are calculated. In block 270, the new parity values are written to the DRAM. The new parity data is a result of the old parity data being eXclusively OR-ed (XORed) with old user data and XORed with new user data. With some enhancements to the XOR processing, the new parity is the result of XOR of all 15 channels. To arrive at the new parity, the method XORs the new data of channel 1 and the old data from channels 2-15:

XOR of channels 2-15=channel 1 XOR parity
New parity=new data (in channel 1) XOR data of channels 2-15

For this reason, the method requires reading the old channel 1 and the old parity. Therefore, when the method writes new data, it first writes the user data on channel 1, then writes the parity data on channel 2. The time required to go through this process on two channels, to do one write, is the time equivalent of six writes when legacy chipkill technology is employed.

In this document, and because blocks 250, 255, 260, 265, and 270 are automatically performed in succession, all the blocks (i.e., the entire write operation including any checking and/or update of the parity data) are performed concurrently.

Figure 3A:
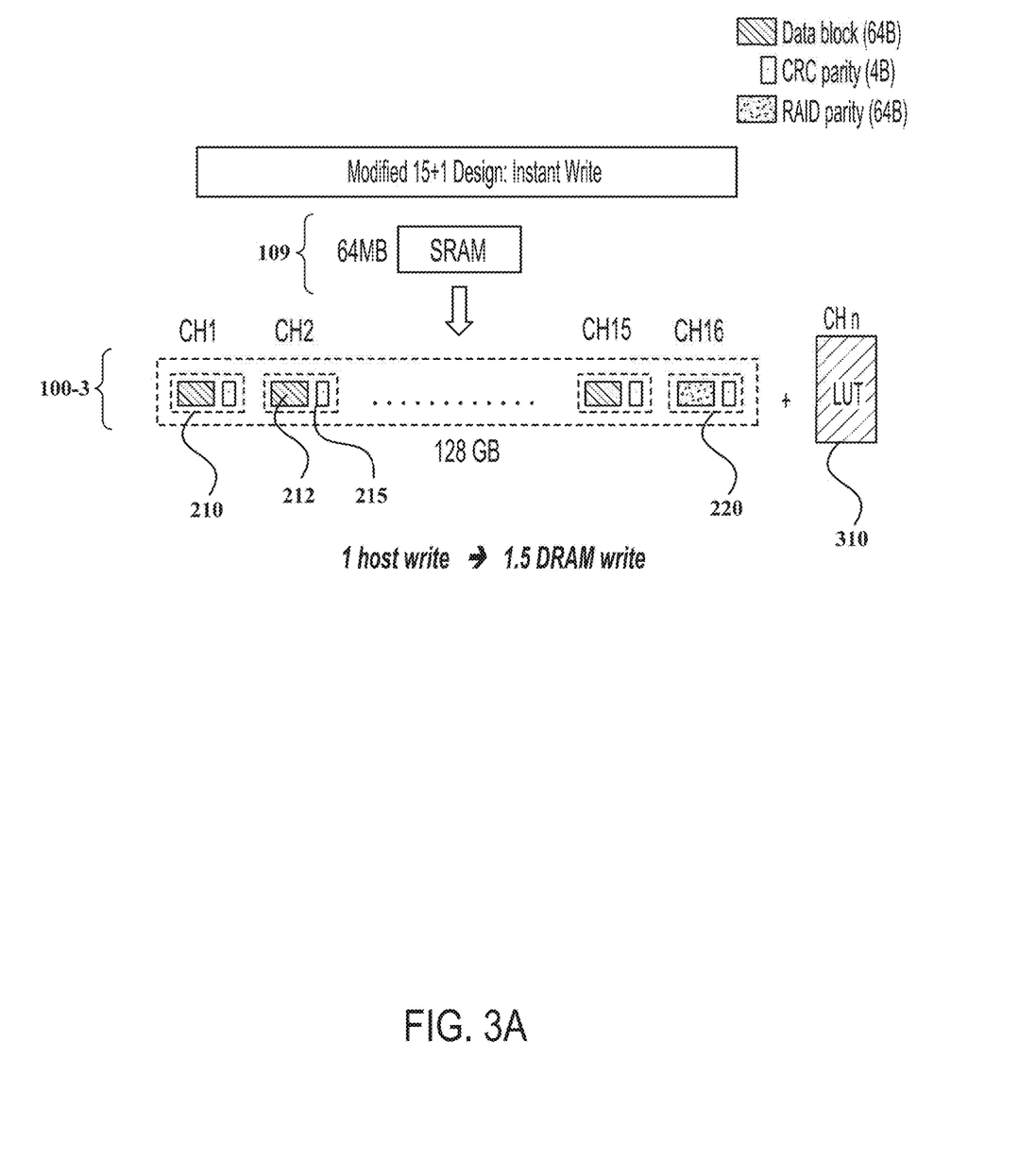
FIG. 3A illustrates an exemplary DRAM memory which may employ error checking plus RAID technology.

FIG. 3A illustrates an exemplary environment in which the embodiments may be applied, including an exemplary DRAM memory 100-3 which may employ error checking (such as CRC) plus RAID technology. Several elements of the exemplary DRAM 100-3 are the same or substantially similar to elements of the exemplary DRAM memory 100-2 of FIG. 2A, and the details are not repeated here.

However, exemplary DRAM memory 100-3 includes an additional memory chip which is a LookUp Table (LUT) 310. The LUT 310 is configured to store an indication that a parity data was either updated during the last write operation, or that the parity data was not updated during the last write operation. That is, the LUT's purpose is to indicate whether the parity in each codeword (data+parity) is updated or outdated. In one embodiment, the size of the LUT 310 is the (total-capacity)/(codeword size), for example, 68 bits*16 channel). For a 128 GB CXL memory, the LUT 310 may be approximately 16 MB to 64 MB.

In alternative embodiments, the parity indications may be in the form of various data tables with suitable columns and rows. For example, rows associated with each parity bit or group of parity bits, or rows for each memory chip. Columns indicate whether the parity bits were set or not set. The parity indications may be in the form of various other suitable data structures or bit settings to maintain a recent history of parity updates or non-updates with respect to a recent write operation.

Figure 3B:
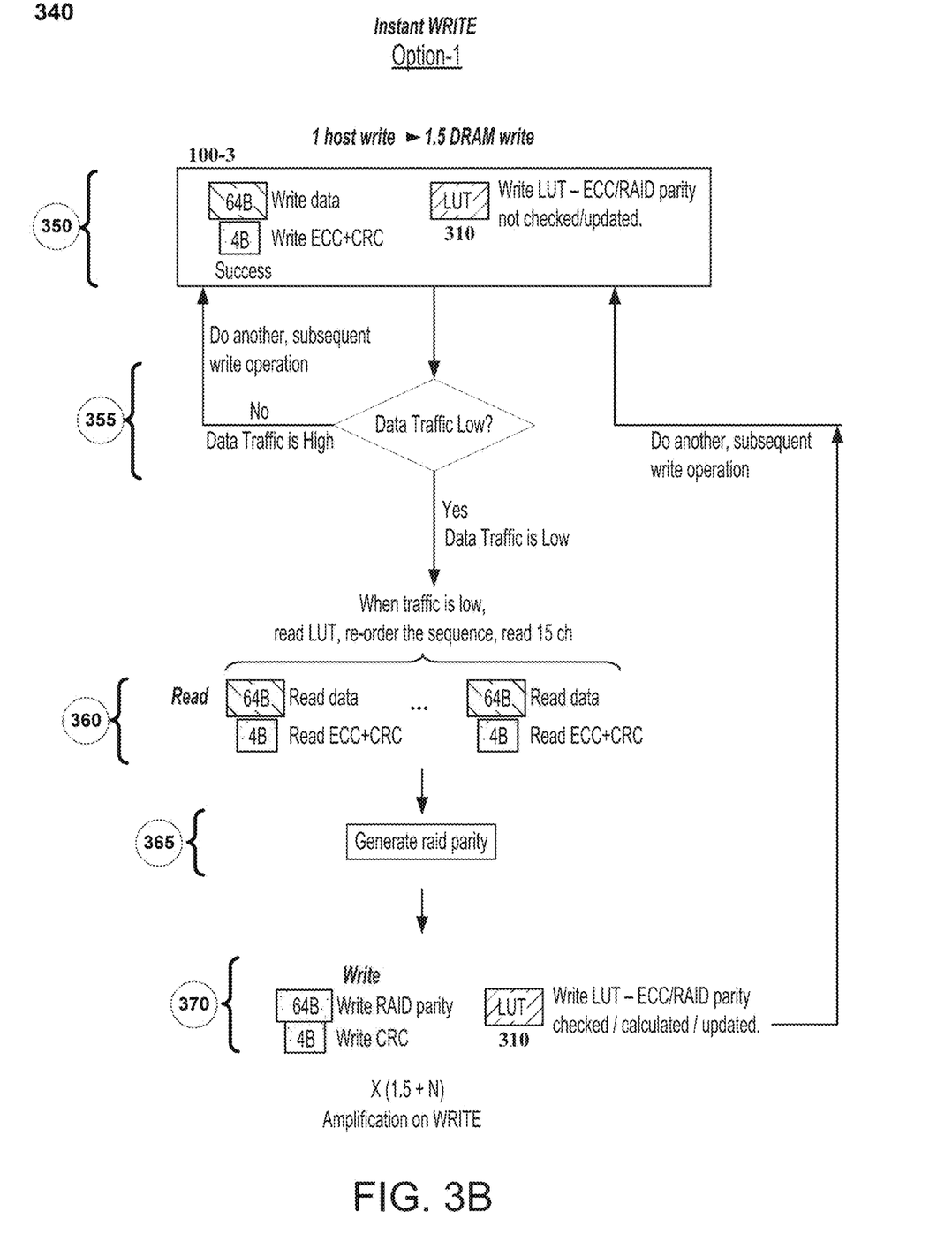
FIG. 3B illustrates an exemplary method where data is written to DRAM including RAID parity data.

FIG. 3B illustrates an exemplary method 340 where data is written to the DRAM, including RAID parity data (stored in channel 16). Exemplary method 340 is referred to herein as "instant write option 1." In the method 340, a host such as static RAM, is written to (e.g., by a CPU or other host). Subsequently, the data is read, and the CRC data based on the read data is calculated.

Unlike the exemplary method 240 of FIG. 2B, the method 340 employs deferred calculations of parity values such as CRC values and RAID parity. Deferred calculations may also be referred to as delayed calculations. Parity calculations require processing cycles that can slow down memory operations.

By deferring parity calculations for times when the required memory traffic is low, overall memory access times can be increased. It will be noted that several equivalent terms may be employed for memory traffic demand, including but not limited to memory demand, memory traffic, memory bandwidth, or more task specific terms such as write traffic, write bandwidth, or write demand.

The method 340 begins with block 350, where a write request is received by the DRAM module 100-3 and the DRAM module 100-3 reads data values from a cache buffer (e.g., SRAM) 109 as may be employed in a CXL DRAM. The data read from the cache includes CRC values for the data and CRC for the RAID bytes. In block 350, the read data values are instantly written to the DRAM chips. In addition, values are written to the LUT 310 to identify whether the meta-data is updated.

More specifically, upon writing the data from the cache memory to the DRAM, the method 340 determines in block 355 if the current memory traffic demand is low. If the memory traffic demand is low, the CRC and the RAID parity may be calculated immediately and written to the DRAM (as per blocks 360, 365, 370, below).

With reference again to block 355, a determination is made if the level of memory traffic demand is high or low. The determination is made by a controller of the DRAM module 100-3, or by a controller of an associated memory management unit 140 of a CXL controller.

A setting of high traffic demand or low traffic demand may be determined according to a threshold value, such as a percentage of memory bus bandwidth currently in use, or a current frequency of data read/write requests, etc. For example, the memory traffic may be monitored by the CXL controller 105 or central controller 107. Assuming the CXL controller 105 is employed, a read/write command sequencer 106 (for arranging the read/write commands priority and sequence) in the CXL controller 105 may be configured with a special update parity command.

The update parity command may be triggered by a threshold value (e.g., a percentage of a memory write request queue currently filled with write requests). That is, the DRAM may have a memory write request queue. The threshold value can be a percentage of how much of the queue which is occupied with write requests. That is, the threshold may specify a degree to which the memory write request queue is currently filled with write requests.

By way of example, suitable thresholds may be 25%, or 30%, or 40% of the queue's total capacity being occupied with write requests. The designated threshold may be specified based on design considerations or testing during product development. The threshold may also be controlled dynamically via code (e.g., firmware in the memory management unit 140). A dynamic threshold can be based on monitoring and assessment of real-time DRAM performance, with a range of thresholds being dynamically tested or evaluated in real-time.

In an exemplary embodiment, the read/write command sequencer 106 will have a write queue (not shown) with a write queue depth, such as 128 or 256, etc., where the write queue maintains a list or tracking of write requests from the host or host processor. To establish a high or low value for memory traffic demand, an exemplary threshold value (e.g., 30%) may be employed with respect to the queue depth.

If the read/write command sequencer 106 finds that the number of waiting user read/write requests is less than 30% of the maximum queue depth (e.g., is less than 128*30%), the sequencer 106 will consider the current volume of traffic to be low, which may trigger the update parity command. If the number of user read/write requests is greater than or equal to 30% of the maximum queue depth, the sequencer 106 may consider the current traffic volume to be high. The threshold value of 30% is exemplary only, and other threshold values may be employed.

If in block 355 the level of memory traffic is determined to be high, for the sake of processing efficiency of current memory requests, it may be desirable to defer or delay calculations of CRC or RAID data bits. In that case the method 340 returns to block 350 where another write operation, pending in the queue, is processed.

If in block 355 the level of memory traffic is determined to be low, the method 340 proceeds with parity checking, RAID data striping, and if needed, with data error correction. It is possible that the parity checking, and RAID data striping, may reflect a current memory which is state based on multiple prior write operations (i.e., multiple write operations where parity updates were not performed at the time of the writer operations). This may be indicated by the LUT 310. More specifically, if in block 355 the level of memory traffic is determined to be low, the method proceeds with block 360.

In block 360, the method 340 reads the LUT 310 to determine which bytes have outdated parity and reads the data from the corresponding channels. In block 365, the method 340 generates the updated RAID parity. In block 370, the method writes the updated RAID parity to the RAID channel 220 (channel 15 in our exemplary case), and updates the CRC for each channel, Updating the parity (CRC and RAID), if performed when a write is performed, would normally require that several read/write commands be executed on the data in the DRAM 100-3. However, in the embodiments, several read/write operations are combined to be performed simultaneously.

For an example, the method 340 as described above may write a codeword 'A_0' (for example on channel 1) without updating parity, so that codeword 'A_15' (the parity byte, channel 15) is outdated. Next, the method 340 may write codeword 'A_1' which shares the same parity with codeword 'A_0'. In such a case, the method can combine the two update operations, updating codeword 'A_15' for correct parity with respect to both of codewords 'A_0' and 'A_15'.

This update is registered in the LUT 310. The record of the CRC/RAID parity updates is referred to as "metadata" ("meta"=data about the data). If memory traffic is high, the CRC and RAID parity calculations are deferred, and the LUT 310 then indicates that the CRC/RAID data were not updated on the most recent write.

In an alternative embodiment, and in place of an LUT 310, a First-in-First-out (FIFO) outdated parity stack (OPS) may be used to store the addresses of outdated parity. In this alternative embodiment, the required memory size for the OPS could be smaller than for the LUT (since the LUT needs an address for every single parity), which is the benefit. When the sequencer in the controller sends an update parity command to the DRAM 100-3, the oldest address in the OPS FIFO is provided and the corresponding parity will be updated.

Compared the method 340 (FIG. 3B) with the method 240 (FIG. 2B), the method 340 has improved latency (i.e., write latency is reduced), without loss of capacity for error detection. Due to variable factors of real-time operations, the exact increase of bandwidth is not easily predicted.

Blocks 350-370 being performed immediately in succession, the entire write operation, including any checking and/or update of the parity data, is referred to as concurrent performance. Concurrent write/parity update occurs when the data traffic demand is low. As discussed above, when the data traffic demand is high, the write operation is performed while the ECC is deferred or delayed.

Figure 4A:
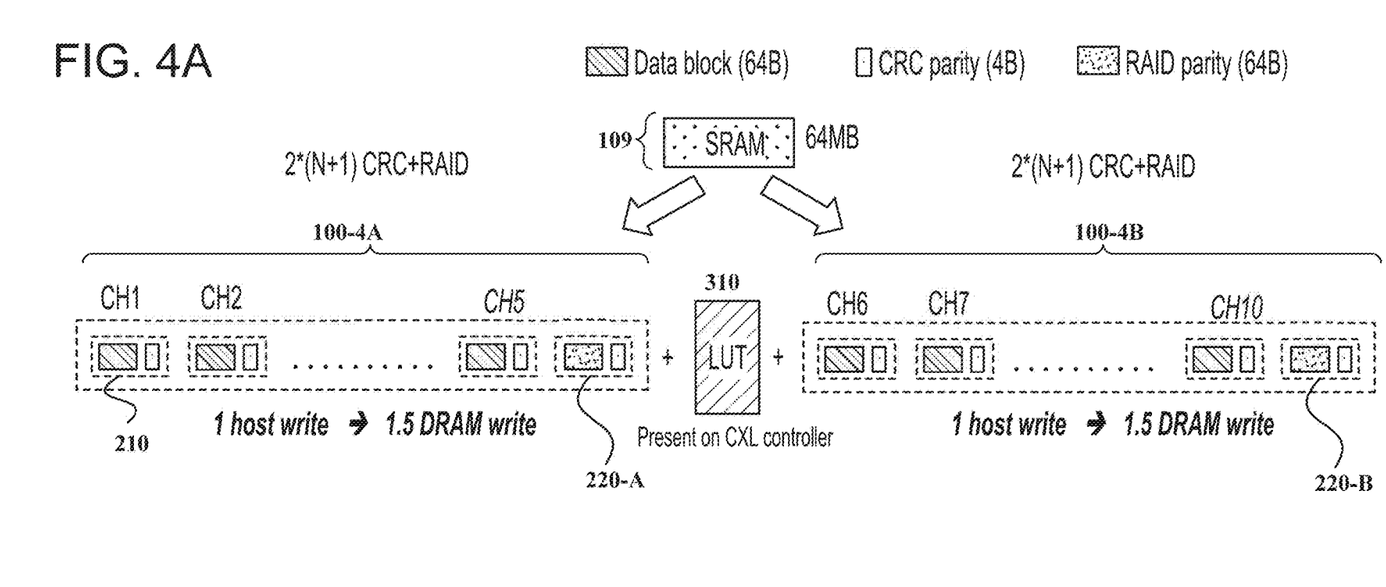
FIG. 4A illustrates an exemplary DRAM memory which may employ error checking plus RAID technology.

FIG. 4A illustrates an exemplary environment in which the embodiments may be applied, including an exemplary DRAM memory 100-4 that includes error checking (e.g., CRC) plus RAID technology. Several elements of the exemplary DRAM 100-4 are substantially similar to elements of the exemplary DRAM memory 100-3 of FIG. 3A. Those similar details will not be repeated here.

The exemplary DRAM 100-4 is logically and electronically split into a plurality of separate DRAM submodules. In the exemplary embodiment of FIG. 4A, the DRAM module 100-4 has two DRAM submodules: a first DRAM submodule 100-4A and a second DRAM submodule 100-4B (referred to herein as DRAM modules 100-4). The two DRAM submodules 100-4 may be mounted in a common circuit board or may be mounted on two separate circuit boards (with two suitable connecting slots on a motherboard or similar).

As with the exemplary DRAM module 100-3 discussed above, the exemplary DRAM submodules 100-4 are configured to work together to read and store an entire cache line, with the cache line requiring for storage both of DRAM submodules 100-4A and 100-4B. However, each of the DRAM submodules 100-4A and 100-4B can have parity checking and/or error correction performed independently and at different times. In an embodiment, each of the DRAM submodule 100-4A and 100-4B has five data chips 210, and each has its own separate RAID parity chip 220 for dedicated, submodule-level RAID data protection.

For example, when a write operation is performed (transferring data from cache memory 109 to DRAM 100-4), data may be written to DRAM submodule 100-4A with an immediately subsequent update of CRC parity and RAID data. Data may also be written to DRAM submodule 100-4B, but any parity update and RAID update is deferred to a later time (i.e., a later write cycle).

In the embodiments, a common LUT 310 tracks parity updates (and lack of parity updates) for the DRAM submodule 100-4A and the DRAM submodule 100-4B. By way of example, the common LUT 310 10 be part of the CXL controller 105 or the central controller 107. In an alternative embodiment, each of DRAM submodule 100-4A and DRAM submodule 100-4B may have its own respective LUT 310.

In one embodiment, the read/write command sequencer 106 maintains a common write queue for the plurality of DRAM submodules 100-4. In an alternative embodiment, the read/write command sequencer 106 additionally, or alternatively, maintains a separate write queue for each submodule (100-4A, 100-4B, etc.) of the plurality of memory submodules 100-4. In general, the read/write command sequencer 106 identifies the level of data traffic demand for each of the memory submodules 100-4.

Figure 4B:
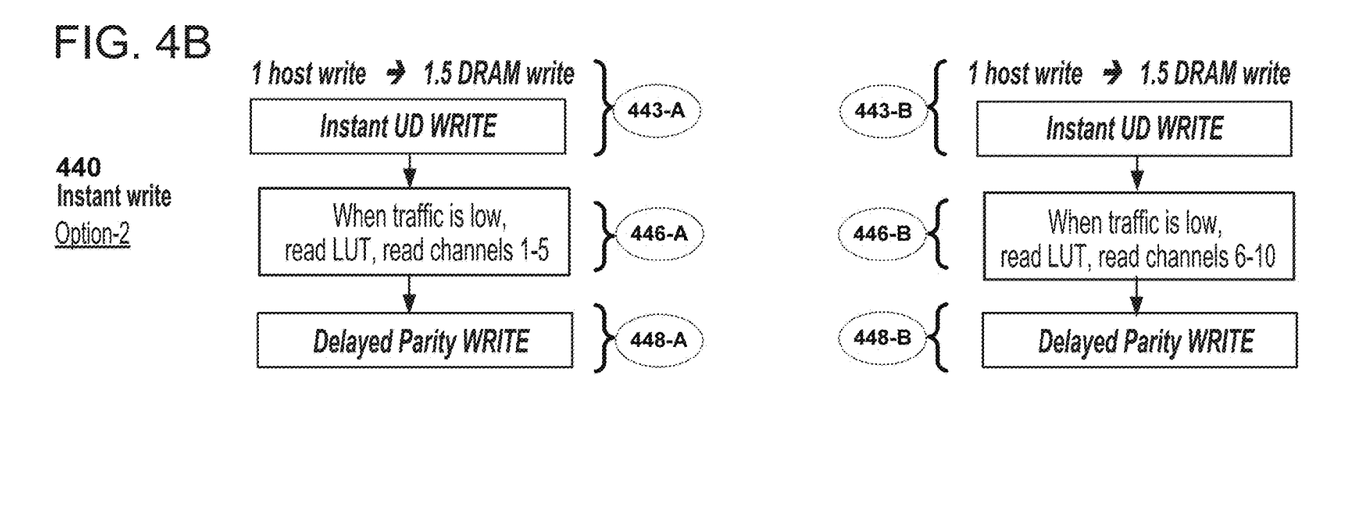
FIG. 4B illustrates an exemplary method where data is written to DRAM including RAID parity data.

FIG. 4B illustrates an exemplary method 440 where data is written to the DRAM 100-4 including RAID parity data (stored in channels 220-A and 220-B). Exemplary method 440 is referred to herein as instant write option 2. In the method 440, a host, such as static RAM cache 109, is written to (e.g., by a CPU or other host). Afterwards, the data is read from the static RAM cache 109). Responsive thereto, the CRC data is calculated.

The method 440 is presented in a condensed form in FIG. 4B. For relevant details, please see the method 340, discussed above. The method 440 differs from method 340 in that the method 340 blocks are applied separately and disjointly to each of DRAM submodules 100-4-A and 100-4-B. As such, both DRAM submodule 100-4-A and DRAM submodule 100-4-B may employ deferred calculations of parity values such as CRC values and RAID parity.

At any given time, DRAM submodules 100-4A and 100-4B may have different memory demands. Accordingly, it may be possible to process parity and RAID data for a first one of the two submodules 100-4, while deferring the parity/RAID calculations for a second one of the two submodules 100-4. The method 440 includes blocks 443, 446, and 448. However, these blocks may be performed as sequential blocks 443-A, 446-A, and 448-A for DRAM submodule 100-4A. The DRAM submodule 100-4A may be separately controlled, separately timed, and at least partly non-synchronous with blocks 443-B, 446-B, and 448-B as applied to DRAM submodule 100-4B.

Block 443 substantially corresponds with block 350 of method 340 and includes an immediate write of cache 109 data, or other host data, to the DRAM submodule 100-4A or 100-4B, as applicable (as determined by the CXL controller 105 or the central controller 107).

Block 446 substantially corresponds with blocks 355 and 360 of method 340 as discussed above. The block 446 includes determining if data traffic for one or the other DRAM submodule 100-4 is low or high. If low, the DRAM data is read in preparation for creating and writing parity data.

Block 448 substantially corresponds with blocks 365 and 370 of the method 340. The block 448 includes determining parity data and RAID data and writing the generated parity and RAID data to the appropriate DRAM submodule 100-4A or 100-4B, as applicable. For a single data write operation to the combined DRAM module 100-4, a first DRAM submodule (e.g., 100-4B) may experience low traffic. As a result, the DRAM submodule may generate and write parity/RAID data immediately after the write operation (i.e., concurrently).

For the same data write operation, a second DRAM submodule (e.g., 100-4A) may experience high traffic, and as such may defer generation and writing of parity and RAID data. At other times, for a single data write operation, both DRAM submodules 100-4 may immediately update the parity and RAID data. At other times, and again for a single write operation, both DRAM submodules 100-4 may defer processing of parity/RAID data.

As per discussion above, when the entire write operation includes an ECC operations immediately successive to the data write, the data write operation and the ECC operations are concurrent. Concurrent write/parity update occurs when the data traffic demand is low. As discussed above, when the data traffic demand is high, the data write operation is performed while the ECC is deferred (or delayed).

Chipkill (with 16+2 DRAM chips) and RAID (with, in one embodiment, 15+1 DRAM chips) are different ECC methods. Chipkill typically is used in commercial DRAM DIMM, while RAID is typically used in Flash memory. Each has benefits and disadvantages. For example, chipkill needs two extra chips and can be expensive. However, its data granularity is small and comparable with CPU/cache size (64 B). RAID, on the other hand, is less expensive. However, the data size is larger and latency performance is generally lower than chipkill. As a result, RAID is typically not used in high speed applications.

The emerging CXL technology provides for a middle layer cache 109 on the controller 50, between the CPU and DRAM 100. As such, the RAID solution presented herein, with optional delayed updates of parity and other error checking, may present an effective balance between cost and error checking/correction reliability, and any drawbacks can be mitigated by the existence of the controller cache 109.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For example, various aspects of the present disclosure can be implemented by software, firmware, hardware (or hardware represented by software such, as for example, Verilog or hardware description language instructions), or a combination thereof. After reading this description, it will become apparent to a person skilled in the relevant art how to implement the disclosure using other memory systems or architectures.

It should be noted that the simulation, synthesis and/or manufacture of the various embodiments of this disclosure can be accomplished, in part, through use of computer readable code, including general programming languages (such as C or C++), hardware description languages (HDL) including Verilog HDL, VHDL, Altera HDL (AHDL), or other programming and/or computer automated design (CAD) tools.

This computer readable code can be disposed in any known computer usable medium including semiconductor, magnetic disk, optical disk (such as CD-ROM, DVD-ROM) and as a computer data signal embodied in a tangible computer usable (e.g., readable) transmission medium (including tangible digital, optical, or analog-based medium). Further, the computer readable code may be transmitted over communication networks, both wired and wireless, including the Internet and intranets. Further, the computer readable code may be transmitted via modulated carrier waves, including but not limited to radio waves, microwaves, and light emissions, where a distinctive pattern of modulation imposed on the carrier wave(s) corresponds to and conveys the computer readable code.

The Detailed Description section, and not the Abstract section, is intended to be used to interpret the claims. The Abstract may set forth one or more but not all exemplary embodiments of the present disclosure as contemplated by the inventor(s), and thus, is not intended to limit the present disclosure and the appended claims in any way.

What is claimed is:

1. A memory system comprising:
   a plurality of memory channels, each having a parity bit;
   a redundant array of independent devices (RAID) parity channel; and
   a controller of the memory system configured to:
   receive a block of data for storage in the memory channels;
   determine at least one of (i) when a data traffic demand on the memory channels is high and (ii) when a data traffic demand on the memory channels is low;
   write the block of data for storage in the memory channels and concurrently updating the parity bits and the RAID parity channel for the stored block of data when the data traffic demand is low; and only write the data for storage in the memory channels when the data traffic demand is high.

2. The memory system of claim 1, wherein the updating is deferred upon determining the data traffic demand is high.

3. The memory system of claim 2, wherein the memory channels comprise dynamic random access memory (DRAM) channels coupled with a plurality of DRAM chips, each being configured to store at least one of (i) a codeword comprising a set of data bytes and one or more parity bytes and (ii) a RAID byte.

4. The memory system of claim 1, further comprising:
a lookup table (LUT) configured to store an indication that a parity data was updated during a prior write operation or was not updated during the prior write operation.

5. The memory system of claim 4, wherein the controller is further configured to:
monitor the data traffic to identify when the data traffic is low subsequent to only writing the data for storage in the memory channels;
read the LUT to determine which parity bits are not set when the data traffic demand is low;
read the channels with the data associated with the unset parity bits when the parity bits are not set;
calculate the parity bits and the raid parity byte for the block of data; and
write the calculated parity bits and the calculated RAID parity byte to the parity bits and RAID parity byte.

6. The memory system of claim 5, wherein the controller is configured to calculate the parity bits and the RAID parity byte, the updated parity encompassing multiple prior write operations.

7. The memory system of claim 1, wherein the controller is configured to determine the memory traffic demand as being high or low based on a threshold value for current or recent memory demand.

8. The memory system of claim 7, wherein the threshold value comprises a percentage of a memory write request queue currently occupied with write requests.

9. The memory system of claim 1, wherein the controller comprises a compute express link (CXL) controller.

10. The memory controller of claim 1, further comprising a cache memory configured to buffer memory writes between a host processor and the plurality of memory channels.

11. The memory system of claim 1, further comprising:
a First-in-First-out (FIFO) outdated parity stack (OPS) configured to store an address of an outdated parity data, thereby indicating when the parity data was not updated during a prior write operation.

12. A method comprising:
receiving at a memory system a block of data for storage in a plurality of memory channels of the memory system;
determining via a controller of the memory system when a data traffic demand on a plurality of memory channels is high or when a data traffic demand on the plurality of memory channels is low;
writing the block of data for storage in the memory channels, and concurrently updating a respective parity bit of each memory channel and updating a redundant array of independent devices (RAID) parity channel of the plurality of memory channels when the data traffic demand is low; and
only writing the data for storage in the memory channels when the data traffic demand is high.

13. The method of claim 12, wherein the update of the parity bits and the RAID parity channel for the stored block of data is deferred.

14. The method of claim 12, wherein writing the block of data for storage in the memory channels comprises writing the memory data into a plurality of DRAM chips, each being configured to store at least one of (i) a codeword comprising a set of data bytes and one or more parity bytes and (ii) a RAID byte.

15. The method of claim 12, further comprising:
storing in a lookup table (LUT) of the memory system either an indication that a parity data was updated during a prior write operation or an indication that the parity data was not updated during the prior write operation.

16. The method of claim 15, further comprising:
subsequent to only writing the data for storage in the memory channels only, while deferring the update of the parity bits and the RAID parity channel, monitoring via the controller the data traffic to identify when the data traffic is low;
reading the LUT to determine which parity bits are not set when the data traffic demand is low;
reading the channels with the data associated with the unset parity bits upon determining which parity bits are not set;
calculating the parity bits and the raid parity byte for the block of data; and
writing the calculated parity bits and the calculated RAID parity byte to the parity bits and RAID parity byte.

17. The method of claim 16, further comprising calculating the parity bits and the RAID parity byte so that the updated parity encompasses multiple prior write operations.

18. The method of claim 12, further comprising determining via the controller that the memory traffic demand is high or low based on a threshold value for current or recent memory demand.

19. The method of claim 18, wherein determining the threshold value comprises determining a percentage of a memory write request queue which is currently occupied with write requests.

20. The method of claim 12, further comprising buffering memory write requests from a host processor in a cache memory for retrieval by the plurality of memory channels.

21. The method of claim 12, further comprising:
storing in a First-in-First-out (FIFO) outdated parity stack (OPS) of the memory system an address of outdated parity, and
upon sending an update parity command to the memory channels, retrieving the oldest address in the OPS FIFO and updating the corresponding parity.

22. A non-transitory computer-readable medium storing code comprising instructions which, when executed by a processor of a memory system, causes the memory system to:
receiving a block of data for storage in a plurality of memory channels of the memory system;
determine when a data traffic demand on the plurality of memory channels is high and when a data traffic demand on the plurality of memory channels is low;
write the block of data for storage in the memory channels, and concurrently update a respective parity bit of each memory channel and update a reductant array of independent devices (RAID) parity channel of the plurality of memory channels when the data traffic demand is low; and only write the data for storage in the memory channels when the data traffic demand is high.

\* \* \* \* \*